United States Patent

[11] 3,575,513

| [72] | Inventors | Raymond E. Gallagher;<br>Marvin H. Hammond, Jr., Columbus, Ohio |
|---|---|---|
| [21] | Appl. No. | 797,305 |
| [22] | Filed | Dec. 18, 1968 |
| [45] | Patented | Apr. 20, 1971 |
| [73] | Assignee | North American Rockwell Corporation |

[54] CORRELATOR TRACKER
21 Claims, 9 Drawing Figs.

[52] U.S. Cl. .................................................. 356/152,
356/141, 250/203
[51] Int. Cl. .............................................. G01b 11/26
[50] Field of Search......................................... 356/141,
152; 235/181; 250/203, 233

[56] References Cited
UNITED STATES PATENTS
| 2,800,831 | 7/1957 | Keiser et al. ................. | 356/141 |
| 3,412,334 | 11/1968 | Whitaker...................... | 235/181 |
| 3,431,405 | 3/1969 | Dawson........................ | 235/181 |

*Primary Examiner*—Rodney D. Bennett, Jr.
*Assistant Examiner*—S. C. Buczinski
*Attorneys*—William R. Lane and Daniel H. Dunbar ABSTRACT: Apparatus and signal-processing methods are provided in a rotating slit-type correlator tracker to derive azimuth angle and depression angle error output signals that are normally in addition to roll angle, yaw angle, and pitch angle error output signals developed in known correlator tracker equipments; disclosed alternate forms of mechanization utilize square waveform and sinusoidal waveform correlation multiplicative coefficients that are a function of rotating slit scan position and that have a double frequency in comparison to the correlation multiplicative coefficient ideally utilized for developing yaw angle and pitch angle error output signals.

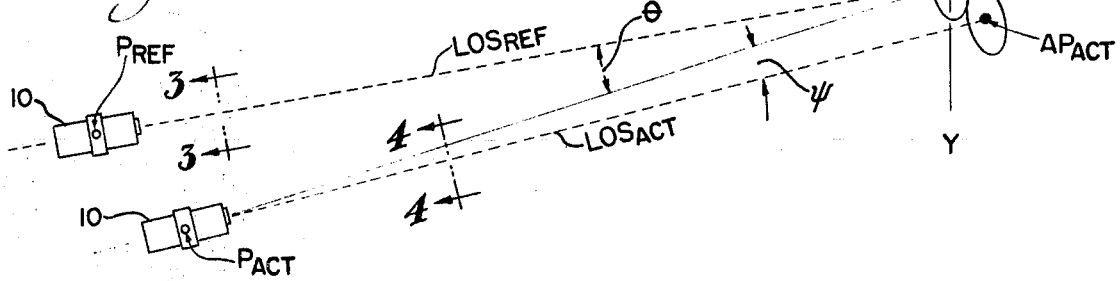
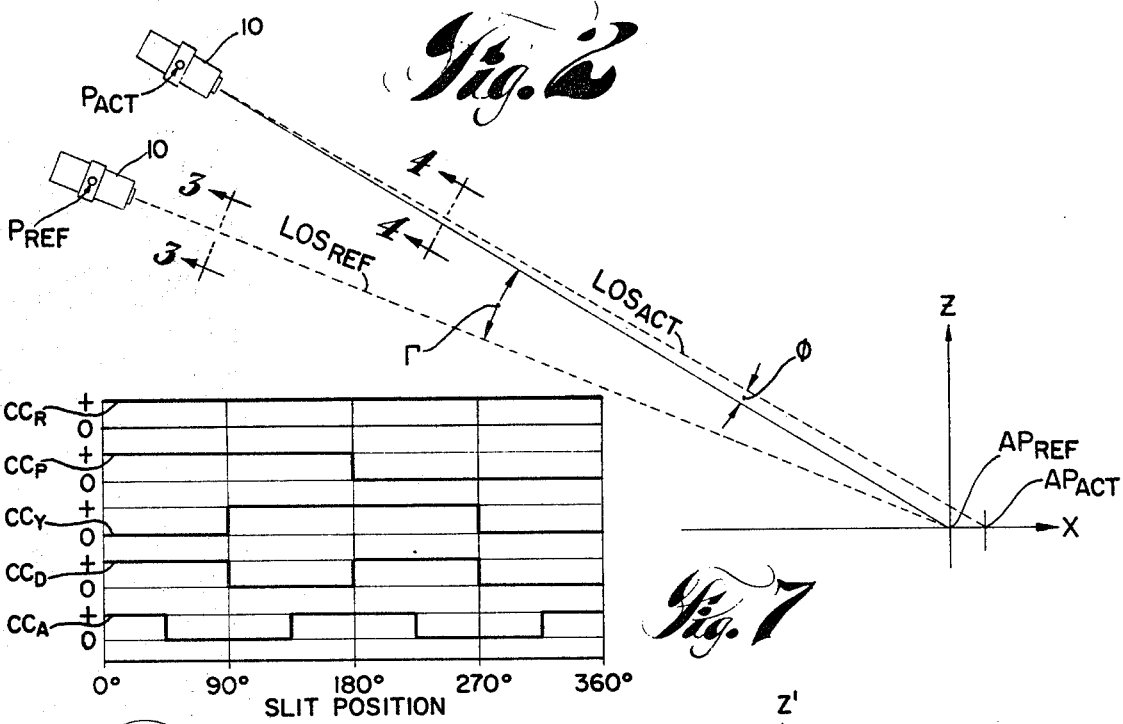
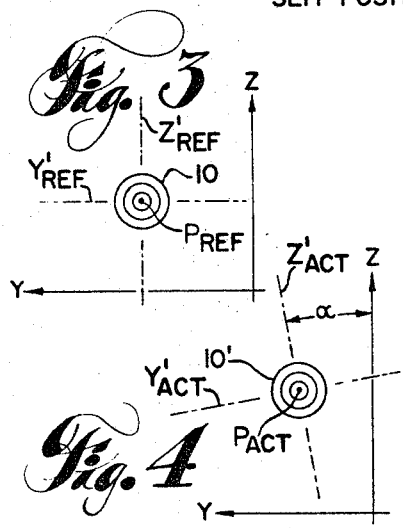
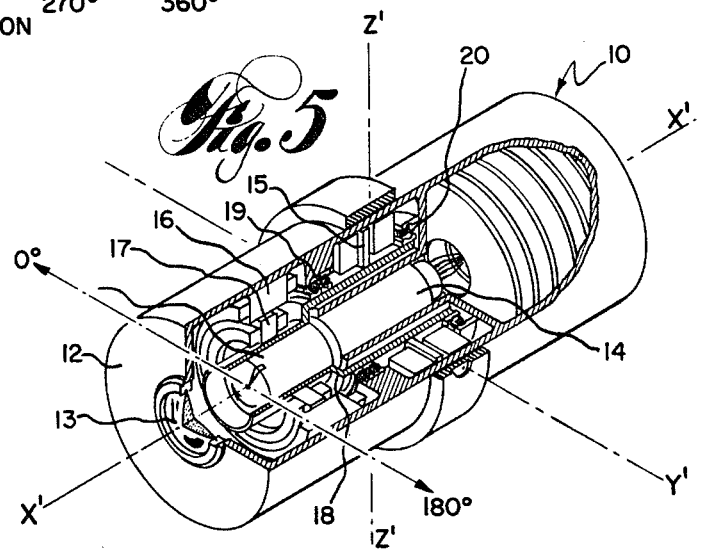

CORRELATOR TRACKER

SUMMARY OF THE INVENTION

An area correlator tracker unit having a rotating slit and synchronized magnetic signal storage means in its scanner or sensor head is provided with apparatus signal-processing channels that separately generate azimuth angle error and depression angle error output signals, such output signals normally being in addition to the yaw angle error and pitch angle error output signals developed in conventional tracker units of the same type. In one embodiment of the invention the separate added signal-processing channels which derive the azimuth angle error and depression angle error output signals utilize correlation multiplicative coefficient signals that are each stored in said magnetic signal storage means and that each have a square waveform of a frequency double the frequency of the correlation coefficient utilized in conventional rotating slit correlator tracker units for developing yaw angle error and pitch angle error output signals. Such correlation coefficient signals are stored approximately 45° out of phase with respect to each other throughout each period of the rotating slit. In the alternate embodiment of the invention the separate signal-processing channels which develop the azimuth angle error and depression angle error output signals utilize correlation multiplicative coefficient signals that are of sinusoidal waveform with the double frequency to develop a still further improved correlator tracker performance capability.

DESCRIPTION OF THE DRAWINGS

FIGS. 1 and 2 are plan and elevational views, respectively, illustrating the space relationships of yaw angle and pitch angle tracking error information which is obtained in conventional correlator tracker systems and also the space relationships of azimuth angle and depression angle tracking error information which may be obtained by practice of the instant invention;

FIGS. 3 and 4 are elevational views taken at lines 3–3 and 4–4, respectively, of FIGS. 1 and 2 and illustrate the space relationships of roll angle tracking error information obtained in conventional correlator tracker systems;

FIG. 5 is a partially sectioned perspective view of a correlator tracker scanner or sensor head assembly of the type to which the present invention has application;

FIG. 7 is a timing diagram for the correlation multiplicative coefficient signals utilized in the apparatus arrangement of FIG. 6;

DETAILED DESCRIPTION

Figure 6:
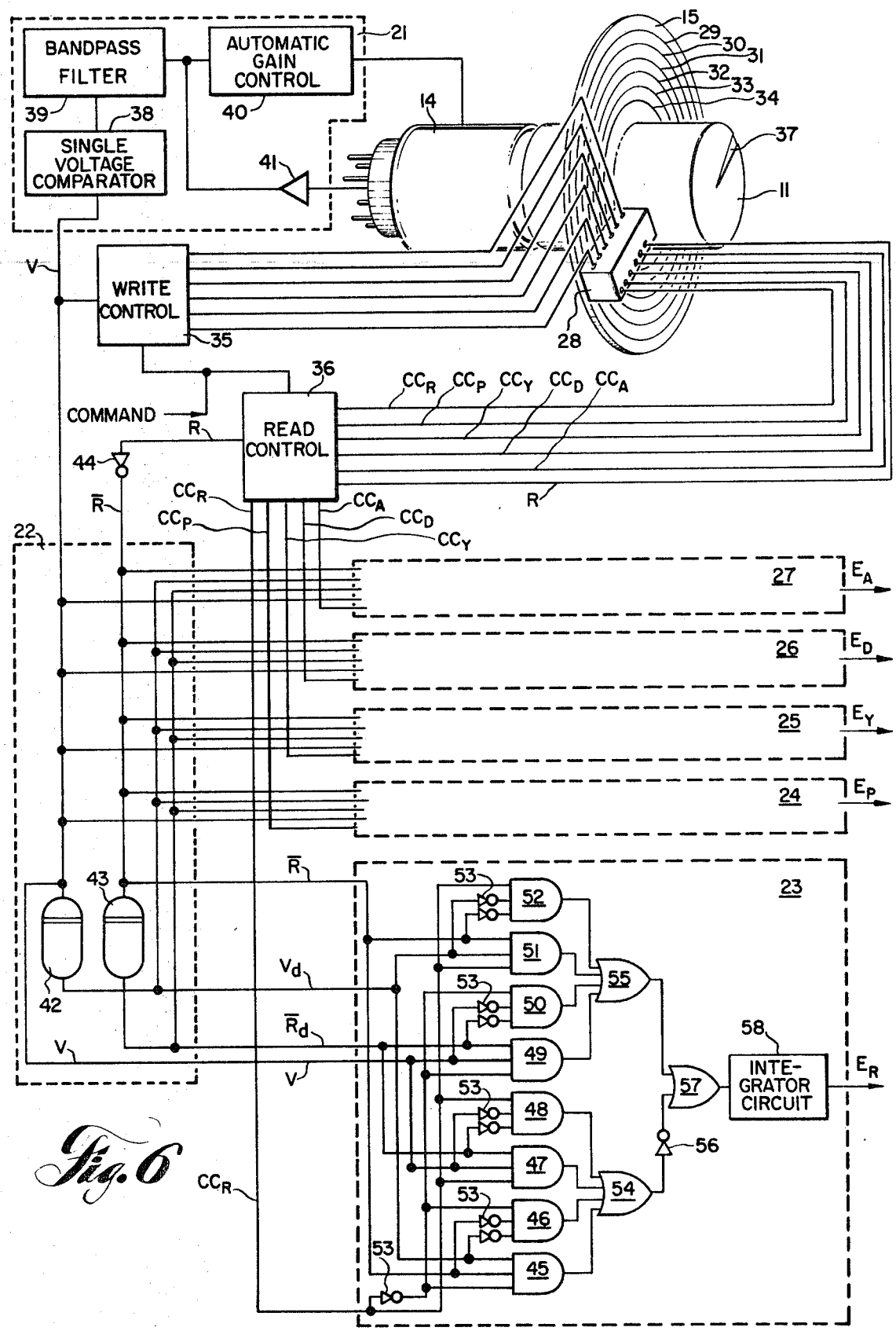
FIG. 6 is a schematic and functional block diagram of one embodiment of apparatus for practicing our invention, such embodiment utilizing double frequency square waveform signals as the required correlation multiplicative coefficients for obtaining azimuth angle error and depression angle error output signals.

FIGS. 1 and 2 illustrate plan and elevational space relationships that exist with respect to apparatus 10 and a distant aim point AP in a representative tracking or guidance problem to which the instant invention has application. Apparatus 10 is shown at a reference position $P_{REF}$ and views the reference aiming point $AP_{REF}$ along line of sight $LOS_{REF}$. For analysis purposes $AP_{REF}$ is considered to be the intersection or origin of conventional coordinate axes X, Y, and Z. Apparatus 10 is also shown in a displaced actual position $P_{ACT}$ and views the actual aim point $AP_{ACT}$ along line of sight $LOS_{ACT}$. $AP_{ACT}$ as well as the reference aim point is in the XY plane, normally a horizontal plane. Angle $\psi$ and $\Phi$ are measures of yaw and pitch guidance error, respectively, and are readily indicated by conventional yaw angle error and pitch angle error output signals derived in the signal processing channels of known correlator trackers having a rotating slit element in the system scanner or sensor head. The illustrated angles $\theta$ and $\Gamma$ are measures of azimuth and depression guidance errors and may be indicated by output signals derived by the apparatus of FIGS. 6 or 8. FIGS. 3 and 4 illustrate the roll guidance error that might exist with respect to the tracking problem of FIG. 1 and 2; the angle $\alpha$ is the measure of the actual roll error.

FIG. 5 illustrates correlator tracker scanner head 10 with a rotating slit optical chopper assembly 11 incorporated therein. The other principal components of scanner head 10 are contained within housing 12 and further include viewing lens system 13, shielded photomultiplier tube 14 of conventional design, and magnetic memory disc 15. Electric motor stator windings 16 and 17 drive the hollow shaft 18 supported within housing 12 by bearings 19 and 20. Optical chopper assembly 11 and memory disc 15 are fixed to hollow shaft 18 and are typically rotated by windings 16 and 17 at rates up to approximately 12,000 revolutions per minute during operation of a scanner head in representative correlator tracker equipments. Optical chopper assembly 11 basically functions to rotationally sample the scene optical image produced by viewing lens system 13 from along the tracker line of sight (optical axis) and to properly transmit and integrate the sampled image light for projection on the active photosensor surface of photomultiplier tube 14. Photomultiplier tube 14 functions to convert the sampled light into an analog electrical signature signal for storage on memory disc 15 if of a reference aim point and for correlation processing with the reference signal to develop tracking error correction signals if of an actual aim point.

The type of correlator tracker to which the instant invention has application is illustrated more completely in FIG. 6. Such correlator tracker includes, in addition to the scanner head 10, a signal processor generally comprised of video processor section 21, delay section 22, and error signal generator channels 23 through 27. Channels 23 through 27 produce output error signals $E_R$ for roll, $E_P$ for pitch, $E_Y$ for yaw, $E_D$ for depression, and $E_A$ for azimuth, respectively. Signal processing in the tracker preferably is accomplished using digital techniques wherever possible. FIG. 6 also illustrates components 11, 14, and 15 of the scanner head assembly 10 shown in FIG. 5. Magnetic memory disc 15 cooperates with magnetic read/write head 28 at the individual magnetic memory tracks 29 through 34. For purposes of illustration, track 34 is used for recording the video signal $V$ produced by video processor section 21 as a reference and tracks 29 through 33 are used for magnetically recording specified timing signals of a correlation coefficient nature for subsequent processing in error signal generator channels 23 through 27. Controls 35 and 36 in the FIG. 6 embodiment are conventional and are responsive to operator commands to cause the necessary reference and correlation coefficient signals to be recorded on memory disc 15 or to be extracted from storage for use in the hereinafter-described signal processing operations.

The arrangement illustrated in FIG. 6 is particularly novel with respect to the separate channels designated 26 and 27 that derive depression angle and azimuth angle error signals and also with respect to the correlation coefficient signals $CC_D$ and $CC_A$ stored in memory tracks 29 and 30 for processing in channels 26 and 27. FIG. 7 illustrates the waveform of novel correlation coefficients $CC_D$ and $CC_A$ as well as the conventional timing signals $CC_R$, $CC_P$, and $CC_Y$ that develop the normal roll, pitch, and yaw angle error information, respectively. Since the tracker system is preferably based on digital or pulsed signal processing, the timing (correlation coefficient) signals recorded on disc 15 have bilevel voltage values. The waveforms illustrated in FIG. 7 detail the timing or correlation coefficient signals and are plotted as a function of the position of the slit 37 in optical chopper assembly 11 in each revolution. The angular values given in FIG. 7 are based on clockwise rotation of slit 37, as shown by the arrow on assembly 11 of FIG. 5; the 0° position and the 180° position are illustrated on the straight line shown in FIG. 5 at the slit-end face of assembly 11. It should be noted that signal $CC_R$ is of constant amplitude, signals $CC_P$ and $CC_Y$ change amplitude at each half period of slit rotation and are 90° out of phase with respect to each other. Correlation coefficients $CC_D$ and $CC_A$ have a double frequency in comparison to the frequency of signals $CC_P$ and $CC_Y$ and are 45° out of phase with respect to each other.

Also as shown in FIG. 6, representative video processor section 21 includes a single voltage comparator circuit 38 that functions to detect zero amplitude crossings in the video signal produced in scanner head 10 by photomultiplier tube 14. A band-pass filter circuit 39 is provided for accentuating low spatial frequencies and for attenuating high frequencies, including noise, generated in the system. Conventional automatic gain control circuit 40 and amplifier circuit 41 are also incorporated in video processor section 21. Circuit 38 converts the amplified and filtered analog video signal from photomultiplier tube 14 representing the electrical signature of the scene viewed by slit 37 in each revolution of optical chopper 11 into a conventional digital representation which is stored on memory disc 15 as a reference signal and which for a current scene is correlated against a previously stored reference signal in the signal processing circuits of the correlator tracker to develop the identified error output signals.

Delay section 22 incorporates delay lines 42 and 43 having identical delay values such as 20 microseconds, for instance, in correlator tracker utilizing a scanning slit which rotates at a rate of 12,000 r.p.m. From a mechanization standpoint, delays 42 and 43 may be developed digitally utilizing differentiated leading edge and trailing edge characteristics of the individual scene or reference pulses to trigger a conventional monostable multivibrator whose fixed time output has the required delay value. The delay value output in both normal and inverted form is then combined with the input pulse according to an "exclusive OR" function to form the input pulse delayed signal. The output signals from delay section 22 are a real-world (live) video signal $V$ in the form established by video processor 21, an inverted reference video signal $\overline{R}$ in the form recorded on memory disc 15, a delayed live video signal $V_d$ in the form of signal $V$ delayed by delay line 42, and a delayed inverted reference signal $\overline{R}_d$ in the form of reference signal $R$ stored on magnetic disc 15 inverted and delayed by delay line element 43. Inverter circuit 44 is provided to invert the basic reference signal $R$ so that it may be processed with real-world signal $V$. Such is necessary since correlation is accomplished with respect to both advances and delays from the reference scene; the one revolution delay in correlation processing because of the inversion at circuit 44, especially in systems involving high rotational scanning rates, does not appreciably degrade system performance.

A conventional construction of one of signal-processing channels 23 through 27 is illustrated schematically in FIG. 6 in connection with roll angle error signal generator channel 23. Channels 24 through 27 are constructed in an identical manner but are distinguished from channel 23 in that a different correlation coefficient factor is utilized in each instance and by the nature of the output error signal. AND gate circuits 45 through 52 appropriately correlate the advanced and delayed live scene signals $V$ and $V_d$ with the advanced and delayed inverted reference signals $\overline{R}_d$ and $R_d$ and also accomplish an appropriate multiplication with the correlation coefficient $CC_R$. The inversions necessary to accomplish placing the input signals into their proper time order and to accomplish a proper differencing of logical functions is accomplished by the different conventional inverter circuits designated 53. The properly combined signals upon gating through circuits 45 through 52 are grouped at OR gate circuits 54 and 55 according to sense and then algebraically subtracted at OR gate circuit 57 as detected error. The output from OR gate circuit 54 is inverted by inverter circuit 56 in order to accomplish the algebraic subtraction. The error detected as the output of OR gate circuit 57 is the input to conventional integrator circuit 58. The integrated output from integrator circuit 58 is the output error signal $E_R$ shown in connection with signal-processing channel 23 and is a direct measure of actual roll angle tracking error. The output signal $E_R$ thus is also a measure of the angle $\alpha$ shown in FIGS. 3 and 4. In the event the actual line of sight ($LOS_{ACT}$) of the system corresponds to the reference line of sight ($LOS_{REF}$), the output from OR gate circuit 57 is essentially zero. The outputs $E_P$ and $E_Y$ from channels 24 and 25 are similar to $E_R$ but are based on multiplication with the indicated correlation coefficients $CC_P$ and $CC_Y$ having a half-period relative to the period of $CC_R$. Such additional error signals are measures of the angles $\Phi$ and $\psi$ of FIGS. 1 and 2. The $\Gamma$ and $\theta$ angular errors of FIGS. 1 and 2 are measured by the outputs $E_D$ and $E_A$, channels 26 and 27. These latter outputs are derived in a novel manner based on a multiplication procedure with the coefficients $CC_D$ and $CC_A$ that are at a double frequency relative to timing signals $CC_P$ and $CC_Y$. These latter outputs are also frequently described as position errors, as distinguished from the other or attitude errors, and are particularly useful in connection with guidance systems that take advantage of optimal guidance laws (minimum time, fuel, etc.) or that are to have significantly increased target acquisition envelopes.

Figures 8, 9:
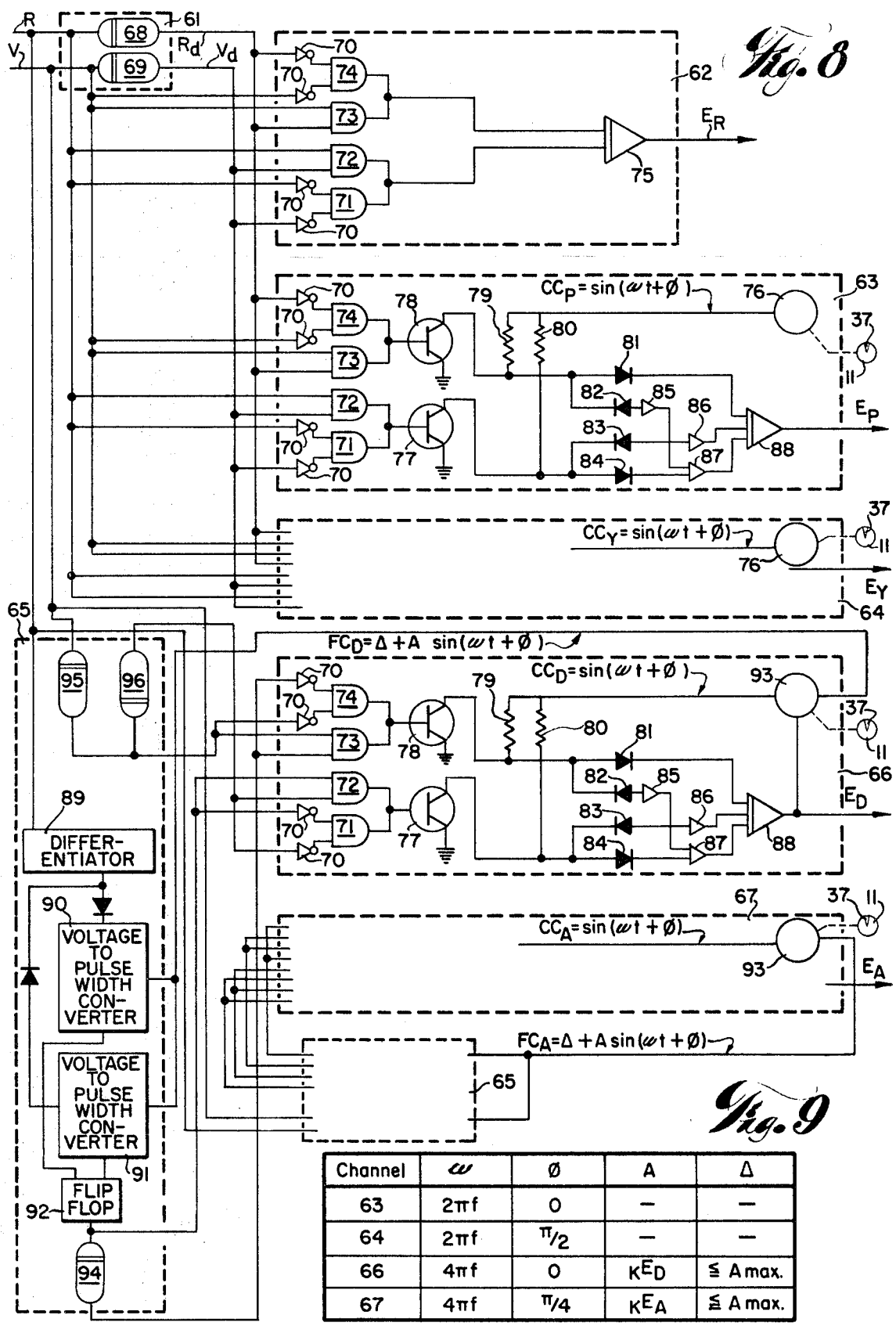
FIG. 8 is a schematic and functional block diagram of an alternate embodiment of apparatus for practicing our invention, such apparatus developing and utilizing sinusoidal waveforms at the double frequency as the correlation multiplicative coefficients that source the azimuth angle error and depression angle error output signals.
FIG. 9 is a table of parameter values for signals used in developing the sinusoidal waveforms utilized in the apparatus arrangement of FIG. 8.

The instant invention is also illustrated in an alternate embodiment in FIG. 8 wherein a double-frequency sinusoidal waveform correlation multiplicative coefficient is utilized for developing the desired depression angle and azimuth angle error output signals. The mechanization for developing the necessary double-frequency correlation coefficients in its basic form may also be advantageously utilized for developing the normal pitch angle and yaw angle error output signals. The input signals to the FIG. 8 arrangement are the real-world video signal $V$ from a video processor section such as section 21 of the FIG. 6 embodiment and the stored reference signal $R$ obtained from memory disc 15 and read control 36 but without inversion. In the FIG. 8 arrangement the input signals are processed through delay section 61 and error signal generator channels 62, 63, and 64 to develop $E_R$, $E_P$, and $E_Y$ error signals for roll angle, pitch angle, and yaw angle errors, respectively. Such error signals will serve to improve correlation tracker performance over that obtained from the corresponding signals developed in the FIG. 6 arrangement. The FIG. 8 arrangement also incorporates identical modified delay sections each designated 65 that process the input $V$ and $R$ signals into a proper delayed form for further correlation processing through error signal generator channels 66 and 67 to develop output error signals $E_D$ for depression angle and $E_A$ for azimuth angle errors, respectively. As in the case of channels 63 and 64, the output signals $E_D$ and $E_A$ from channels 66 and 67 also result in an improved tracker performance over the performance obtained from the corresponding error signals developed in the FIG. 6 embodiment.

Delay section 61 incorporates delay lines 68 and 69 which may be identical in form and which are identical in function to the delay lines 42 and 43 of delay section 22. The $V$ and $R$ signals are combined and differenced with the delayed $V_d$ and $R_d$ signals, after inversion as illustrated by inverter circuits 70, in the AND gate circuits 71 through 74. The differences of the combined signals are processed into integrating operational amplifier 75 for algebraic addition and integration into the conventional output signal $E_R$ which is a measure of detected roll angle error.

Signal processing within channels 63 and 64 is generally similar to the signal processing of channel 62 except that a resolver means 76 synchronized with the rotation of optical chopper assembly 11 and included slit 37 produces a correlation multiplicative coefficient signal $CC_P$ having a sinusoidal waveform. More specifically, such FIG. 8 sinusoidal waveform signal varies in amplitude with slit rotational position according to the function sin $(\omega t + \Phi)$. Specific values for the $\omega$ and $\Phi$ parameters in channel 63 (and also in related channel 64) are given in the table of FIG. 9. From a mechanization standpoint, resolver 76 may be in the form of a variable resistor wherein the wiper element is mechanically coupled to assembly 11 in a 1:1 driven/driver rotational ratio. The difference outputs from AND gates 71 through 74 control transistor circuits 77 and 78 that switch the correlation multiplicative coefficient output of resolver 76 through cooperating resistors 79 and 80. Diodes 81 through 84 serve to detect the sense of the analog signal at resistors 79, 80 for proper processing through adding operational amplifiers 85 through 87 and through integrating operational amplifier 88. Amplifier 88 corresponds in function to amplifier 75 in channel 62 and to integrator circuit 58 of channel 23 (FIG. 6). The output signal $E_P$ from amplifier 88 obtains improved tracker performance over the corresponding signal developed in the FIG. 6 arrangement because of use of the sinusoidal waveform correlation multiplicative coefficient produced by resolver means 76 rather than the square waveform signal form developed in the FIG. 6 scheme.

Yaw error channel 64 is constructed in the manner of channel 63 and functions in a like manner except that one of the parameter values ($\Phi$) for the correlation coefficient $CC_Y$ developed by resolver means 76 is different as detailed by FIG. 9. The channel output signal $E_Y$, as in the case of the output signal $E_P$ for channel 63, also obtains improved tracker performance over the corresponding signal of the FIG. 6 embodiment.

The additional signal-processing channels in the FIG. 8 arrangement for developing depression angle error and azimuth angle error output signals differ from the corresponding channels in FIG. 6 and also from the above-described channels 63 and 64 in at least two important respects. First, identical delay sections 65 each function to provide a reference signal delay increment that varies in each revolution of scanning slit 37 (optical chopper assembly 11) as a function of slit position in a prescribed manner. Second, the resolver means incorporated in each such additional signal-processing channel to develop a sinusoidal waveform correlation multiplicative coefficient signal similar to the output of resolver means 76 also functions to develop a feedback control signal (FC, FIG. 8) that is utilized to control the magnitude of the reference signal variable delay increment generated in delay sections 65. Such resolver means is generally similar to the resolver means 76 of signal-processing channels 63 and 64 except for the additional feedback control signal output and also except for the utilization of different specified output signal parameter values as indicated by FIG. 9.

Each modified delay section 65 develops a reference signal $R$ for use in subsequent correlation by means of conventional circuits 89 through 93. Conventional differentiator circuit 89 detects the leading and lagging edges (e.g., positive-going and negative-going voltages) of each pulse of an input reference signal $R$ received from disc 15 and control 36 without inversion by circuit 44. The detected leading edge is converted to a pulse form output and triggers voltage to pulse width converter circuit 90; the detected lagging edge of each reference signal $R$ pulse is converted to pulse form in circuit 89 and the output triggers conventional voltage to pulse width converter circuit 91. The trailing edge of the output pulses from circuits 90 and 91 are in a like manner utilized to set and reset, respectively, the active state of conventional flip-flop circuit 92. A feedback control signal (FC, FIG. 8) from the resolver means 93 of each additional signal-processing channel determines the pulse width of the output signals from circuits 90 and 91 as a function of rotating slit position at a double frequency in comparison to channel 63, 64 frequencies. The feedback control signals for additional channels 66 and 67 are designated $FC_D$ and $FC_A$ in FIG. 8, comprise the functions shown in the FIG. 8 equations, and utilize the applicable parameter values set forth in the table of FIG. 9. Delay circuit 94 of signal-processing channel 65 is similar in form and function to delay circuit 43 illustrated in connection with the arrangement of FIG. 6.

The real-world video signal $V$ utilized in the FIG. 8 arrangement is obtained from a video processor section such as section 21 in the FIG. 6 arrangement. Such video signal also is processed in each delay section 65 for subsequent correlation but first through a delay circuit 95 that provides the $\Delta$ delay value which appears in the feedback control signal $FC$ produced by resolver means 93. The video signal $V$ after delay by circuit 95 is further delayed by additional delay circuit 96 that functions to establish the basic correlation delay in the manner of delay circuit 42 in delay section 22. The delay produced by circuit 95 is normally in the range of 10 to 100 times the delay developed by either of circuits 94 or 96. As in the previously described arrangement, the delays accomplished by circuits 94 and 96 may have values to as little as approximately 20 microseconds in a representative correlator tracker unit.

We claim:

1. In correlator tracker apparatus for developing output viewing angle error signals, the combination comprising:
   a. slit means rotated at a frequency $f$ about a viewing axis to continuously sample light from a scene image;
   b. photomultiplier means receiving light sampled by said slit means and converting the received light into an output electrical signal that is a signature of the scene image sampled by said slit means;
   c. video signal processor means receiving the output electrical signal of said photomultiplier means and converting the received signal into a bilevel pulsed output video signal;
   d. memory means storing a selected bilevel pulsed video signal of said video signal processor means as a reference signal;
   e. delay means receiving said memory means stored reference signal and said video signal processor means output video signal and converting the received signals respectively into an output delayed reference signal and an output delayed video signal; and
   f. error signal generator means cross-correlating said delay means output signals, said video signal processor means output video signal, and said memory means output reference signal in combination with a correlation multiplicative coefficient to develop an output viewing angle error signal, said correlation multiplicative coefficient being in signal form with an amplitude that is varied in each complete revolution of said slit means as a function of slit means rotational position and cyclically at a double frequency that is twice said frequency $f$.

2. The invention defined by claim 1, wherein said correlation multiplicative coefficient signal is a square waveform approximation of said function, said square waveform approximation being approximately the sine function of said slit means rotational position at said double frequency.

3. The invention defined by claim 1, wherein said correlation multiplicative coefficient signal is a sinusoidal waveform approximation of said function, said sinusoidal waveform approximation being the sine function of said slit means rotational position at said double frequency.

4. The invention defined by claim 1, wherein said error signal generator means develops an output viewing angle error signal that is a measure of depression angle error, and wherein said apparatus comprises an additional error signal generator means which develops an additional viewing angle error signal that is a measure of azimuth angle error, said error signal generator means and said additional error signal generator means each cross-correlating said delay means output signals, said video signal processor means output video signal, and said memory means output reference signal in combination with a correlation multiplicative coefficient signal that is uniformly approximately 45° out of phase with respect to the other said correlation multiplicative coefficient signal.

5. The invention defined by claim 1, wherein said delay means output delayed reference signal is delayed by an amount of time that is varied in each complete revolution of said slit means as a function of slit means rotational position and cyclically at a double frequency that is twice said frequency $f$.

6. The invention defined by claim 5, wherein said delay means output delayed reference signal is delayed by an amount of time comprised of successive time increments, one of said successive time increments being a fixed amount of time and the other of said time increments being an amount of time that varies as a sine function of said slit means rotational position at said double frequency.

7. The invention defined by claim 6, wherein said delay means output delayed video signal is delayed by an amount of time comprised of successive time increments, one of said output delayed video signal successive time increments being a fixed amount of time substantially corresponding to said output delayed reference signal successive time increment fixed amount of time and the other of said output delayed video signal successive time increments being a fixed amount of time that is from 10 to 100 times the amount of time of said one output delayed video signal successive time increment.

8. The invention defined by claim 5, wherein said error signal generator means develops an output viewing angle error signal that is a measure of depression angle error, and wherein said apparatus comprises an additional delay means and an additional error signal generator means cross-correlating said additional delay means output signals, said video signal processor means output video signal, and said memory means output reference signal in combination with an additional correlation multiplicative coefficient to develop an additional viewing angle error signal that is a measure of azimuth angle error, each said delay means output delayed reference signal being delayed by an amount of time that is varied uniformly approximately 45° out of phase with respect to the variation of the amount of time the other output delayed reference signal is delayed by the other said delay means, and each said error signal generator means cross-correlating signals in combination with a correlation multiplicative coefficient signal that is uniformly approximately 45° out of phase with respect to the other said correlation multiplicative coefficient signal.

9. In correlator tracker apparatus for developing output viewing angle error signals, the combination comprising:
 a. slit means rotated at a frequency $f$ about a viewing axis to continuously sample light from a scene image;
 b. photomultiplier means receiving light sampled by said slit means and converting the received light into an output electrical signal that is a signature of the scene image sampled by said slit means;
 c. video signal processor means receiving the output electrical signal of said photomultiplier means and converting the received signal into a bilevel pulsed output video signal;
 d. memory means storing a selected bilevel pulsed video signal of said video signal processor means as a reference signal; and
 e. signal-processing means receiving said memory means reference signal and said video signal processor means output video signal and cross-correlating the received signals according to a function of slit means rotational position to develop an output viewing angle error signal;
said signal-processing means cross-correlating said memory means reference signal and said video signal processor means output video signal according to a function that is varied in each complete revolution of said slit means cyclically at a double frequency twice said frequency $f$.

10. The invention defined by claim 9, wherein said signal-processing means develops an output viewing angle error signal that is a measure of depression angle error, and wherein said apparatus comprises an additional said signal-processing means which develops an additional viewing angle error signal that is a measure of azimuth angle error, said signal-processing means and said additional signal-processing means each cross-correlating said memory means reference signal and said video signal processor means output video signal according to a function that is varied in each complete revolution of said slit means uniformly approximately 45° out of phase with respect to the function that is varied in the other said signal-processing means.

11. In correlator tracker apparatus for developing output viewing angle error signals, the combination comprising:
 a. slit means rotated at a frequency $f$ about a viewing axis to continuously sample light from a scene image;
 b. photomultiplier means receiving light sampled by said slit means and converting the received light into an output electrical signal that is a signature of the scene image sampled by said slit means;
 c. video signal processor means receiving the output electrical signal of said photomultiplier means and converting the received signal into a bilevel pulsed output video signal;
 d. memory means storing a selected bilevel pulsed video signal of said video signal processor means as a reference signal;
 e. delay means receiving said memory means reference signal and said video signal processor means output video signal and converting one of the received signals into a first output signal that is variably delayed in each complete revolution of said slit means according to a function of slit means rotational position and the other of the received signals into a second output signal that is delayed in each complete revolution of said slit means by a constant amount of time; and
 f. error signal generator means cross-correlating said delay means first and second output signals, said video signal processor means output video signal, and said memory means output reference signal to develop an output viewing angle error signal;
said delay means first output signal being variably delayed in each complete revolution of said slit means according to a function that is varied in each complete revolution of said slit means cyclically at a double frequency twice said frequency $f$.

12. The invention defined by claim 11, wherein said error signal generator means develops an output viewing angle error signal that is a measure of depression angle error, and wherein said apparatus comprises an additional said delay means and an additional said error signal generator means which develops an additional viewing angle error signal that is a measure of azimuth angle error, each said delay means and said additional delay means first output signal being variably delayed in each complete revolution of said slit means according to a function that is varied in each complete revolution of said slit means uniformly approximately 45° out of phase with respect to the function that is varied in the other of said delay means.

13. In a method of cross-correlating a bilevel pulsed output video signal that is a signature of a scene image presently sampled by a slit means rotated throughout one complete revolution at a frequency $f$ with a bilevel pulsed output reference signal that is a signature of a scene image previously sampled by said slit means throughout one complete revolution at said frequency $f$ to develop an output viewing angle error signal, the steps of:
 a. delaying said output video signal by an amount of time to thereby form a delayed video signal;
 b. delaying said output reference signal by an amount of time to thereby form a delayed reference signal; and c. cross-correlating said video signal, said reference signal, and said delayed signals in combination with a correlation multiplicative coefficient signal to develop said output viewing angle error signal;

said correlation multiplicative coefficient signal being amplitude-varied in each complete revolution of said slit means as a function of slit means rotational position and cyclically at a double frequency that is twice said frequency $f$.

14. The invention defined by claim 13, wherein said correlation multiplicative coefficient signal is amplitude-varied as a square waveform approximation of said function, said square waveform approximation being approximately the sine function of said slit means rotational position at said double frequency.

15. The invention defined by claim 13, wherein said correlation multiplicative coefficient signal is amplitude-varied as a sinusoidal waveform approximation of said function, said sinusoidal waveform approximation being the sine function of said slit means rotational position at said double frequency.

16. In a method of cross-correlating a bilevel pulsed output video signal that is a signature of a scene image presently sampled by a slit means rotated throughout one complete revolution at a frequency $f$ with a bilevel pulsed output reference signal that is a signature of a scene image previously sampled by said slit means throughout one complete revolution at said frequency $f$ to develop an output viewing angle error signal, the steps of:

a. delaying said output video signal by an amount of time to thereby form a delayed video signal;

b. delaying said output reference signal by an amount of time to thereby form a delayed reference signal; and c. cross-correlating said video signal, said reference signal, and said delayed signals to develop said output viewing angle error signal;

one of said delayed signals being delayed by an amount of time that is varied in each slit means complete revolution substantially as a sine function of slit means rotational position and cyclically at a double frequency twice said frequency $f$ and the other of said delayed signals being delayed by an amount of time that is constant in each slit means complete revolution.

17. The invention defined by claim 16, wherein the step of cross-correlating said video signal, said reference signal, and said delayed signals is accomplished in combination with a correlation multiplicative coefficient signal, said correlation multiplicative coefficient signal being amplitude-varied in each complete revolution of said slit means as a function of slit means rotational position and cyclically at a double frequency twice said frequency $f$.

18. The invention defined by claim 2, wherein said error signal generator means develops an output viewing angle error signal that is a measure of depression angle error, and wherein said apparatus comprises an additional error signal generator means which develops an additional viewing angle error signal that is a measure of azimuth angle error, said error signal generator means and said additional error signal generator means each cross-correlating said delay means output signals, said video signal processor means output video signal, and said memory means output reference signal in combination with a correlation multiplicative coefficient signal that is uniformly approximately 45° out of phase with respect to the other said correlation multiplicative coefficient signal.

19. The invention defined by claim 3, wherein said error signal generator means develops an output viewing angle error signal that is a measure of depression angle error, and wherein said apparatus comprises an additional error signal generator means which develops an additional viewing angle error signal that is a measure of azimuth angle error, said error signal generator means and said additional error signal generator means each cross-correlating said delay means output signals, said video signal processor means output video signal, and said memory means output reference signal in combination with a correlation multiplicative coefficient signal that is uniformly approximately 45° out of phase with respect to the other said correlation multiplicative coefficient signal.

20. The invention defined by claim 6, wherein said error signal generator means develops an output viewing angle error signal that is a measure of depression angle error, and wherein said apparatus comprises an additional delay means and an additional error signal generator means cross-correlating said additional delay means output signals, said video signal processor means output video signal, and said memory means output reference signal in combination with an additional correlation multiplicative coefficient to develop an additional viewing angle error signal that is a measure of azimuth angle error, each said delay means output delayed reference signal being delayed by an amount of time that is varied uniformly approximately 45° out of phase with respect to the variation of the amount of time the other output delayed reference signal is delayed by the other said delay means, and each said error signal generator means cross-correlating signals in combination with a correlation multiplicative coefficient signal that is uniformly approximately 45° out of phase with respect to the other said correlation multiplicate coefficient signal.

21. The invention defined by claim 7, wherein said error signal generator means develops an output viewing angle error signal that is a measure of depression angle error, and wherein said apparatus comprises an additional delay means and an additional error signal generator means cross-correlating said additional delay means output signals, said video signal processor means output video signal, and said memory means output reference signal in combination with an additional correlation multiplicative coefficient to develop an additional viewing angle error signal that is a measure of azimuth angle error, each said delay means output delayed reference signal being delayed by an amount of time that is varied uniformly approximately 45° out of phase with respect to the variation of the amount of time the other output delayed reference signal is delayed by the other said delay means, and each said error signal generator means cross-correlating signals in combination with a correlation multiplicative coefficient signal that is uniformly approximately 45° out of phase with respect to the other said correlation multiplicative coefficient signal.